(12) United States Patent
Volfson

(10) Patent No.: US 12,510,724 B2
(45) Date of Patent: Dec. 30, 2025

(54) BAYONET LATCH FOR OCULAR DISPLAYS

(71) Applicant: Torrey Pines Logic, Inc., San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 402 days.

(21) Appl. No.: 18/156,206

(22) Filed: Jan. 18, 2023

(65) Prior Publication Data

US 2023/0228966 A1   Jul. 20, 2023

Related U.S. Application Data

(60) Provisional application No. 63/300,487, filed on Jan. 18, 2022.

(51) Int. Cl.
*G02B 7/02* (2021.01)
*G02B 27/01* (2006.01)

(52) U.S. Cl.
CPC ......... *G02B 7/022* (2013.01); *G02B 27/0149* (2013.01)

(58) Field of Classification Search
CPC .......................... G02B 7/022; G02B 27/0149
USPC ........................................................ 359/819
See application file for complete search history.

(56) References Cited

U.S. PATENT DOCUMENTS

| | | | | |
|---|---|---|---|---|
| 4,451,131 A * | 5/1984 | Shimizu | ................... | G02B 7/14 396/505 |
| 4,458,990 A * | 7/1984 | Kawai | ..................... | G02B 7/10 359/703 |
| 4,496,217 A * | 1/1985 | Aoyagi | ................. | F16H 25/186 359/823 |
| 4,639,112 A * | 1/1987 | Nakai | ..................... | G03B 7/095 396/227 |
| 4,733,945 A * | 3/1988 | Bacich | ................ | G03F 7/70825 396/529 |
| 4,912,498 A * | 3/1990 | Nakai | ..................... | G03B 7/097 396/227 |
| 9,175,924 B1 | 11/2015 | Wiliford | | |
| 9,658,029 B1 | 5/2017 | Wiliford | | |
| 10,317,156 B2 | 6/2019 | Shaver | | |
| 2016/0219202 A1* | 7/2016 | Barros | ................. | H04B 1/3888 |
| 2018/0348473 A1* | 12/2018 | Sasaki | .................. | G03B 17/566 |
| 2019/0320101 A1* | 10/2019 | Lincoln | .................. | H04N 23/51 |
| 2021/0180903 A1 | 6/2021 | Markut et al. | | |
| 2021/0181603 A1* | 6/2021 | Tamura | ................ | H04N 23/663 |
| 2022/0400196 A1* | 12/2022 | Vitale | .................... | H04N 23/57 |

OTHER PUBLICATIONS

Wikipedia.org [online], "Bayonet mount," updated on May 13, 2023, [retrieved on May 22, 2023], retrieved from: URL<https://en.wikipedia.org/wiki/Bayonet_mount>, 6 pages.

* cited by examiner

*Primary Examiner* — Daniel A Hess
(74) *Attorney, Agent, or Firm* — Fish & Richardson P.C.

(57) ABSTRACT

An optical device includes an ocular assembly that includes an ocular housing comprising an inner surface and an outer surface, the ocular housing including a bayonet latch mating surface extending radially inwards from the inner surface of the ocular housing. The optical device includes a main body assembly that includes a main body housing that houses the objective lens assembly, the housing comprising an outer surface comprising a bayonet latch receiving surface, and an objective lens assembly secured within the main body housing.

18 Claims, 9 Drawing Sheets

BAYONET LATCH FOR OCULAR DISPLAYS

CROSS REFERENCE TO RELATED APPLICATION

Pursuant to 35 U.S.C. § 119(e), this disclosure claims the benefit of U.S. Provisional Patent Application Ser. No. 63/300,487 filed on Jan. 18, 2022, titled, "Bayonet Latch for Ocular Displays," the entire contents of which are incorporated by reference herein.

BACKGROUND

Afocal optical systems produce no net convergence or divergence of optical inputs. An afocal optical system can be formed by the combination of two focal optical systems. The rear focal point of a first focal optical system is coincident with the front focal point of the second focal optical system. Rays parallel to the axis in the object space are conjugate to rays parallel to the axis in the image space.

SUMMARY

Aspects of the embodiments are directed to an optical device that includes an ocular assembly and a main body assembly. The ocular assembly includes an ocular housing comprising an inner surface and an outer surface, the ocular housing comprising a bayonet latch mating surface extending radially inwards from the inner surface of the ocular housing. The main body assembly includes a main body housing that houses the objective lens assembly, the housing comprising an outer surface comprising a bayonet latch receiving surface, and an objective lens assembly secured within the main body housing.

Some embodiments include a focal lens assembly housed in the main body housing.

In some embodiments, the ocular assembly comprises a digital view screen.

In some embodiments, the ocular assembly comprises an afocal optical adapter.

In some embodiments, the ocular assembly comprises an ocular lens assembly.

Aspects of the embodiments include an optical device that includes an ocular lens assembly; and a main body assembly, wherein the ocular lens assembly is removably coupled to the main body assembly by a bayonet latch connector.

In some embodiments, the ocular lens assembly comprises a bayonet latch mating protrusion; and the main body assembly comprises a bayonet latch receiver to receive the bayonet latch mating protrusion.

In some embodiments, the main body assembly comprises a bayonet latch mating protrusion; and the ocular lens assembly comprises a bayonet latch receiver to receive the bayonet latch mating protrusion.

Some embodiments include a focal lens assembly housed in the main body housing.

In some embodiments, the ocular assembly comprises a digital view screen.

In some embodiments, the ocular assembly comprises an afocal optical adapter.

In some embodiments, the ocular assembly comprises an ocular lens assembly.

Aspects of the embodiments are directed to an apparatus that includes a housing; an ocular lens assembly housed within the housing; and a bayonet latch connector portion to cooperate with a bayonet latch connector portion on a main body assembly.

In some embodiments, the bayonet latch connector portion comprises a bayonet latch mating protrusion.

In some embodiments, the bayonet latch connector portion comprises a bayonet latch mating receiver.

In some embodiments, the bayonet latch mating receiver comprises an axially oriented receiver slot and a circumferentially oriented locking slot.

Some embodiments include a display device connected to an end of the ocular assembly.

Some embodiments include an afocal adapter connected to an end of the ocular assembly.

Drawings are not to scale.

DETAILED DESCRIPTION

This disclosure describes an optical device that includes an ocular assembly and a main body assembly. The ocular assembly can include a bayonet-style latch to mate with a bayonet style receiver on the main body assembly.

Figure 1A:
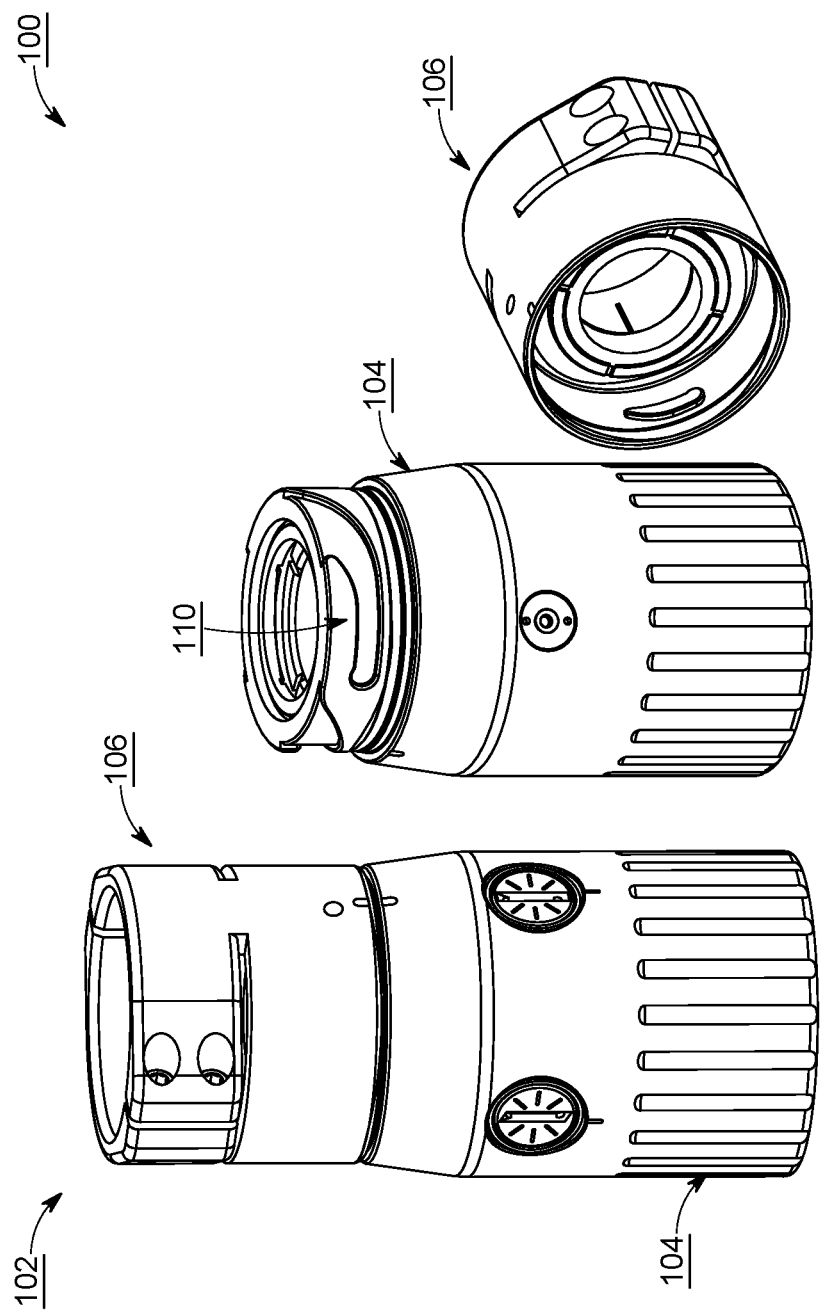
FIGS. 1A-1B are schematic diagrams of an example optical device that uses a bayonet latch in accordance with embodiments of the present disclosure.
Figure 1B:
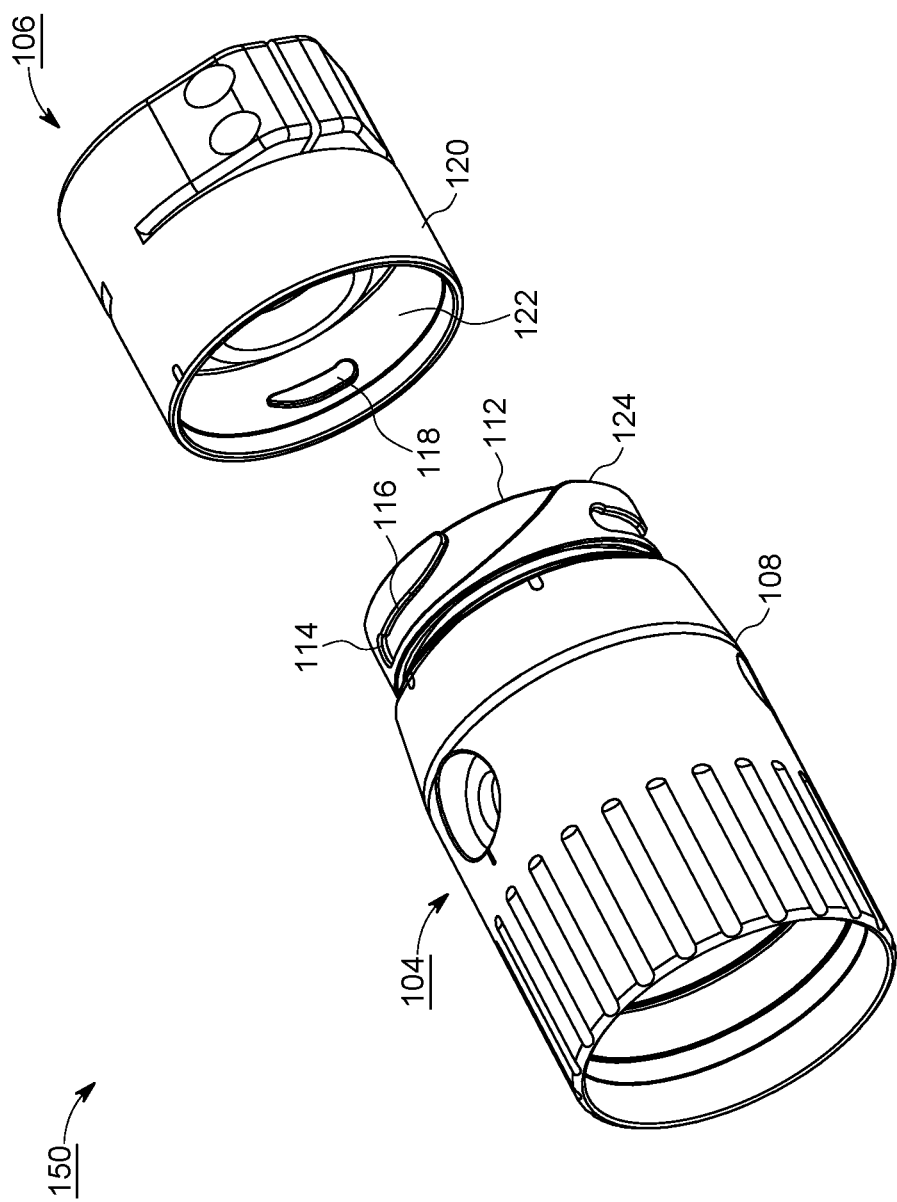

FIGS. 1A-1B are schematic diagrams of an example optical device that uses a bayonet latch in accordance with embodiments of the present disclosure. FIG. 1A is a schematic diagram 100 of an example optical device 102. Optical device 102 can include a main body assembly 104 and an ocular assembly 106. The main body assembly 104 is shown to include a main body bayonet latch receiver 110 on a receiving surface of the main body assembly 104. The ocular assembly 104 is shown to be attached and detached from the main body assembly 104.

FIG. 1B is a schematic diagram 150 of the optical device of FIG. 1A, showing the main body assembly 104 and the ocular assembly 106 detached from each other. As shown in FIG. 1B, the main body assembly 104 includes a main body housing 108. The main body housing 108 can house various optical components, such as objective lens assembly, focal lens assembly, thermal imager, infrared imager, optical emitters, etc.

The main body assembly 104 can also include a bayonet latch mating surface 124. The bayonet latch mating surface 124 includes one or more bayonet latch receivers 110 (shown in FIG. 1A). The bayonet latch receiver 110 includes a main body bayonet latch axial slot opening that can receive a corresponding mating component (e.g., bayonet latch mating protrusion) on the ocular assembly 106. The bayonet latch receiver 110 also include a circumferentially oriented latch stop 114. The latch stop 114 can represent the end of travel for the bayonet latch mating protrusion 118. The bayonet latch receiver 110 can also include a sidewall 116. The latch stop 114 and the sidewall 116 can ensure that the ocular assembly 106 securely fastens to the main body assembly using the bayonet latch.

The ocular assembly 106 can include a housing 120. The housing can securely house various ocular optical components, including an ocular lens assembly, a digital display, electronics, etc. The housing 120 can include an inner surface 122. A bayonet latch mating protrusion 118 can extend radially from the inner surface 122 towards the inside of the housing 120. The bayonet latch mating protrusion 118 can be a radial pin, an extended protrusion (as shown in FIG. 1B), or other shape. The bayonet latch mating protrusion 118 can cooperate with the bayonet latch receiver 110 to secure the ocular assembly 106 to the main body assembly 104.

Figure 2A:
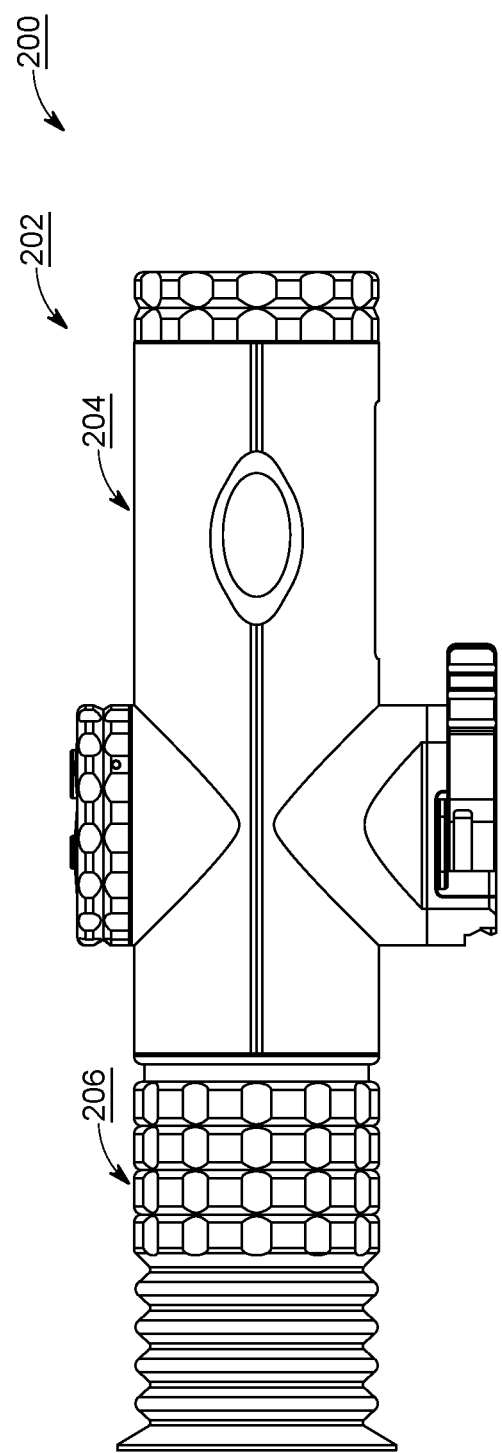
FIGS. 2A-2B are schematic diagrams of an optical device with and without an ocular lens assembly.
Figure 2B:
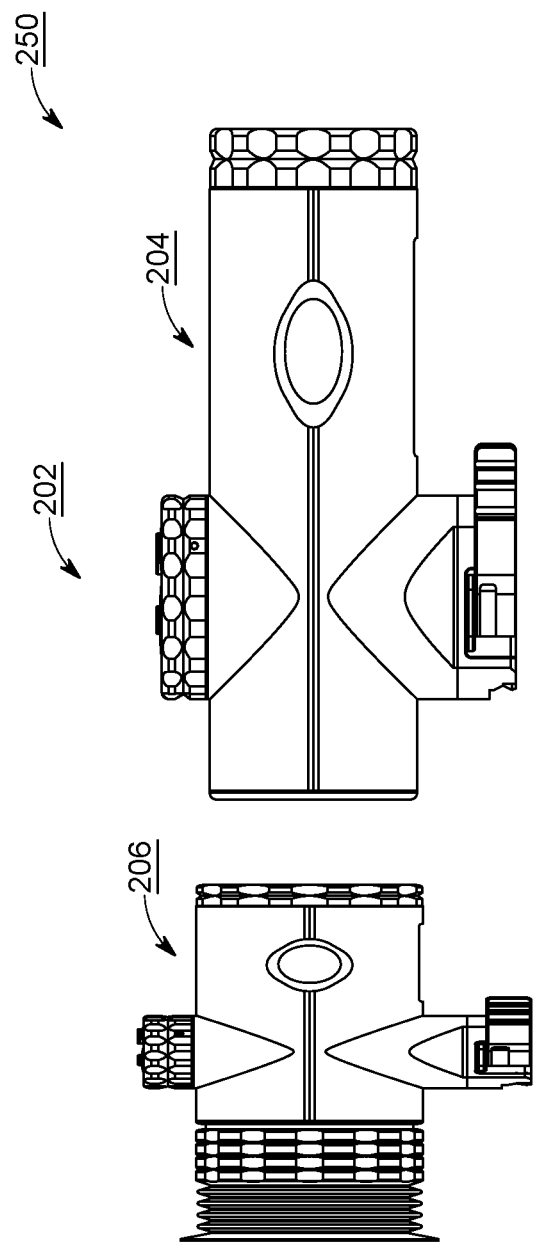

FIGS. 2A-2B are schematic diagrams of an optical device with and without an ocular lens assembly. FIG. 2A is a schematic diagram 200 of an optical device 202 that includes a main body assembly 204 and an ocular assembly 206. Similar to optical device 102, the optical device 202 includes a main body assembly 204 and an ocular assembly 206. The main body assembly 204 can include a main body housing that can house various optical components, such as an objective lens assembly, thermal imagers, infrared imagers, optical emitters, etc. The main body assembly 204 can also include a focal lens assembly. The ocular assembly 206 can include ocular lens assembly, digital electronics, view screen display, and other components. The ocular assembly 206 is attachable and detachable from the main body assembly 202 by a bayonet latch or bayonet connector. FIG. 2B is a schematic diagram 250 of the optical device 202, where the ocular assembly 206 is detached from the main body assembly 204.

Figure 3A:
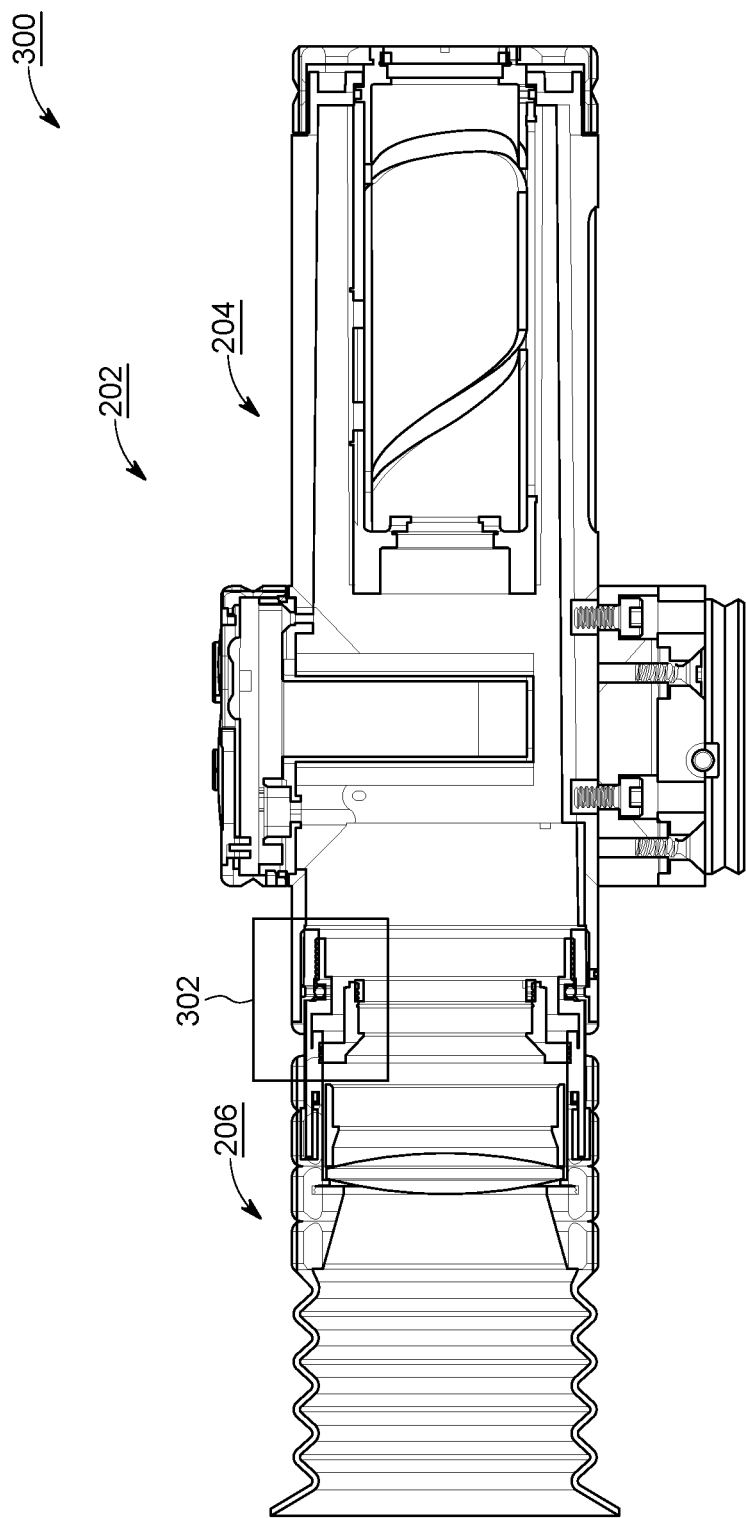
FIGS. 3A-3B are schematic diagrams of a cross-sectional view of an optical device with a bayonet latch coupling an ocular assembly with a main body in accordance with embodiments of the present disclosure.
Figure 3B:
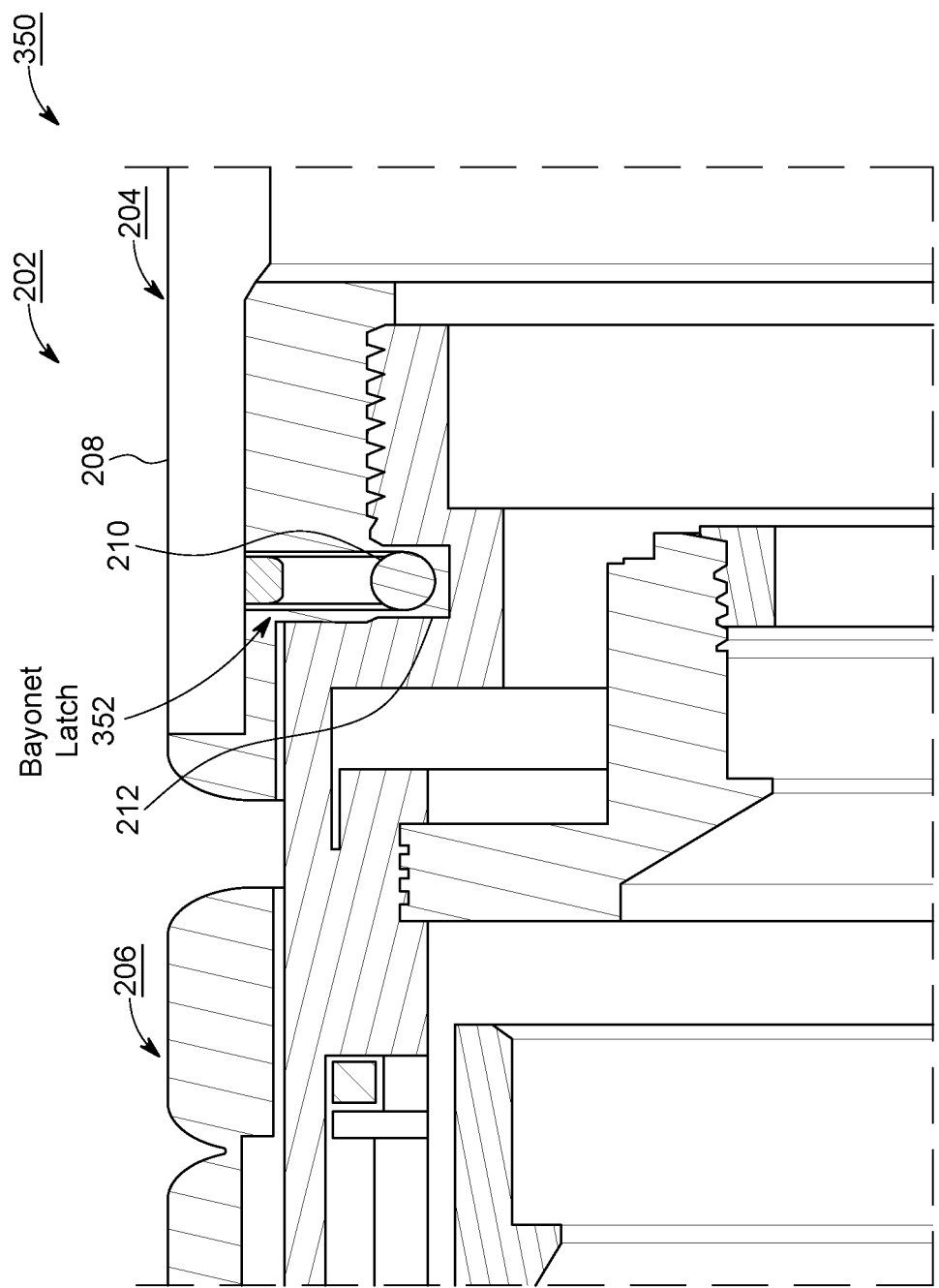

FIGS. 3A-3B are schematic diagrams of a cross-sectional view of an optical device with a bayonet latch coupling an ocular assembly with a main body in accordance with embodiments of the present disclosure. FIG. 3A is a schematic diagram 300 of the example optical device 202 of FIGS. 2A-2B. The cross-sectional view highlights a portion 302 of the optical device 202 where the ocular assembly 206 mates with the main body assembly 204 by a bayonet latch. FIG. 3B is a close-up view of the optical device 202 showing the mating between the ocular assembly 206 and the main body assembly 204 by a bayonet latch connector 352. In this example, the main body assembly includes a housing 208 with an inner surface. The inner surface can include a bayonet latch mating protrusion 210. The ocular assembly 206 can include a bayonet latch receiver 212, similar to that described in FIGS. 1A-1B. The bayonet latch receiver 212 can include an axially oriented slot to receive the bayonet latch mating protrusion 210. The bayonet latch receiver 212 can also include a circumferentially oriented receiver shape. The bayonet latch receiver 212 cooperates with the bayonet latch mating protrusion. A twisting motion causes the bayonet latch mating protrusion to be guided axially and circumferentially into the bayonet latch receiver 212 to secure the ocular assembly 206 onto the main body assembly 204.

In embodiments, the bayonet latch mating protrusion can include an electrode pair (anode/cathode) that can mate with an electrode pair on the bayonet latch receiver. This way, the mechanical connection between the bayonet latch mating protrusion and the bayonet latch receiver can establish electrical communications between the ocular assembly and the main body assembly.

Figure 4:
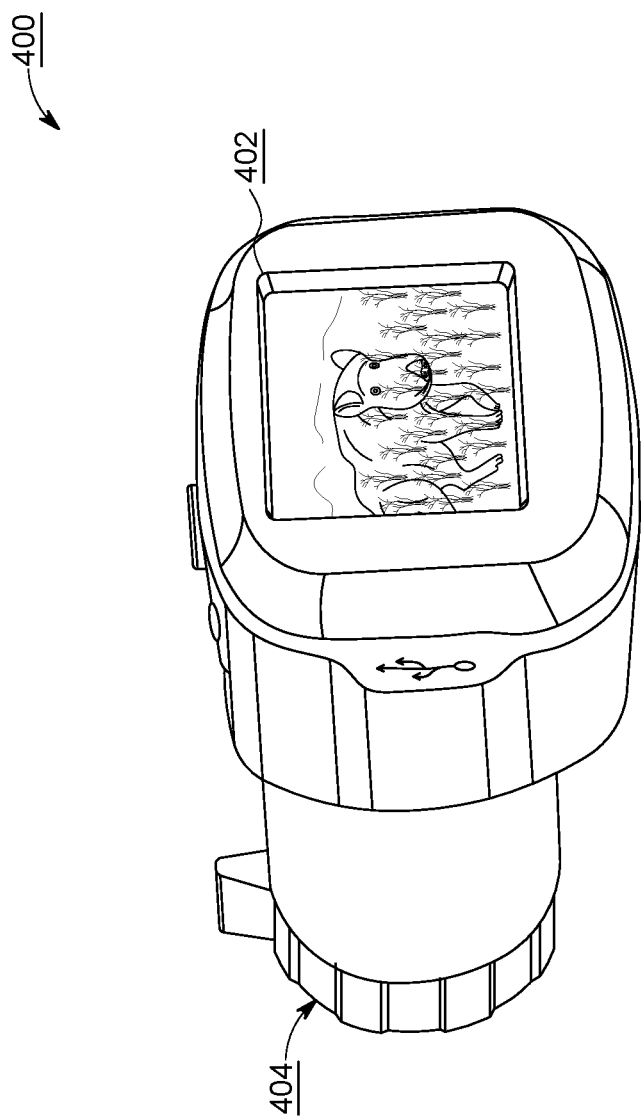
FIG. 4 is a schematic diagram of an example display device that can connect to the ocular latch of a scope in accordance with embodiments of the present disclosure.

FIG. 4 is a schematic diagram of an example display device 400 that can connect to the bayonet latch of a main body assembly in accordance with embodiments of the present disclosure. The display device 400 can be considered to be an ocular assembly in accordance with embodiments of the present disclosure. The display device 400 can be coupled onto the main body assembly of an optical device using a bayonet latch, as described herein. For example, the display device 400 can include a bayonet latch 404, which can be a bayonet latch receiver or bayonet latch mating protrusion (depending on implementation scenario). the display device 400 can include a display 402, which can display information from an ocular lens assembly or from a mated main body assembly.

Figure 5:
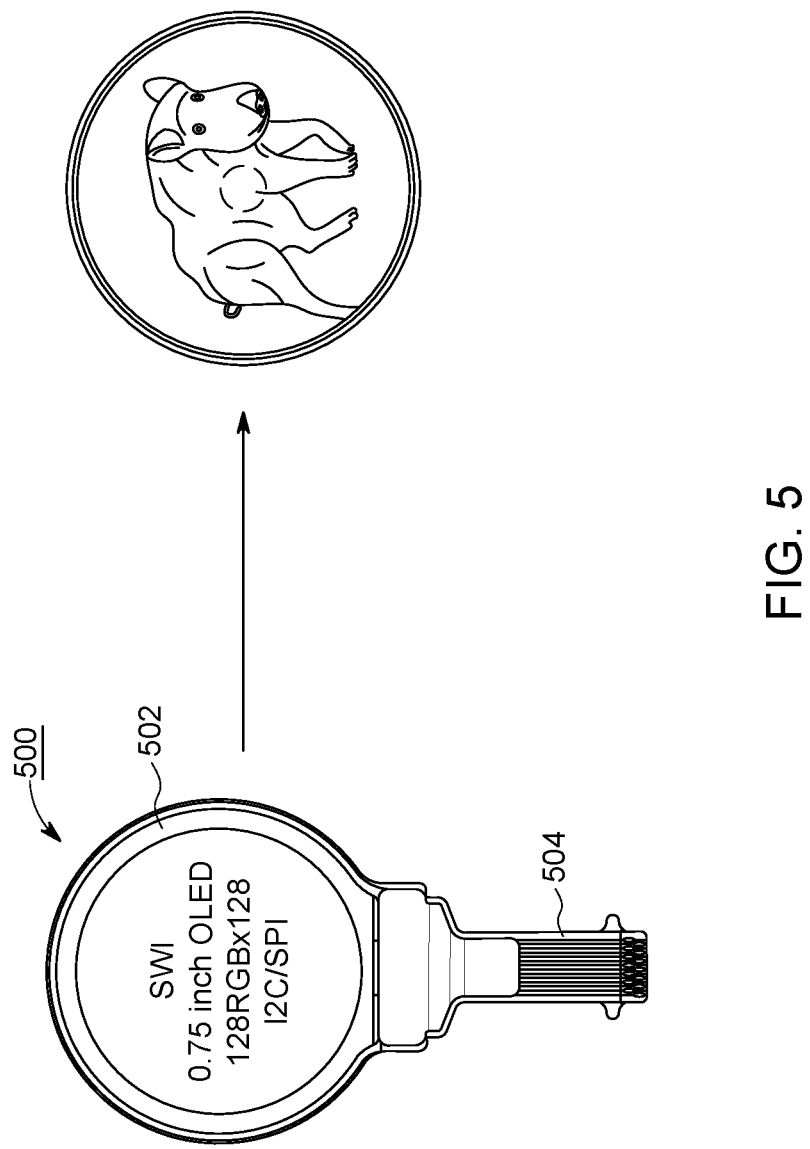
FIG. 5 is a schematic diagram of an example watch-like device that can connect to an optical device body using a bayonet latch in accordance with embodiments of the present disclosure.

FIG. 5 is a schematic diagram of an example watch-like device 500 that can connect to an optical device main body assembly using a bayonet latch in accordance with embodiments of the present disclosure. The watch-like device 500 can include a small circular or other shaped display device, similar to a smart watch form factor. The watch-like device can display optical information, ranging information, camera imagery, or other digital information that it receives from main body assembly. With different display and optics, the optical device with the attached display can become a clip-on to be integrated with other optics.

Figure 6:
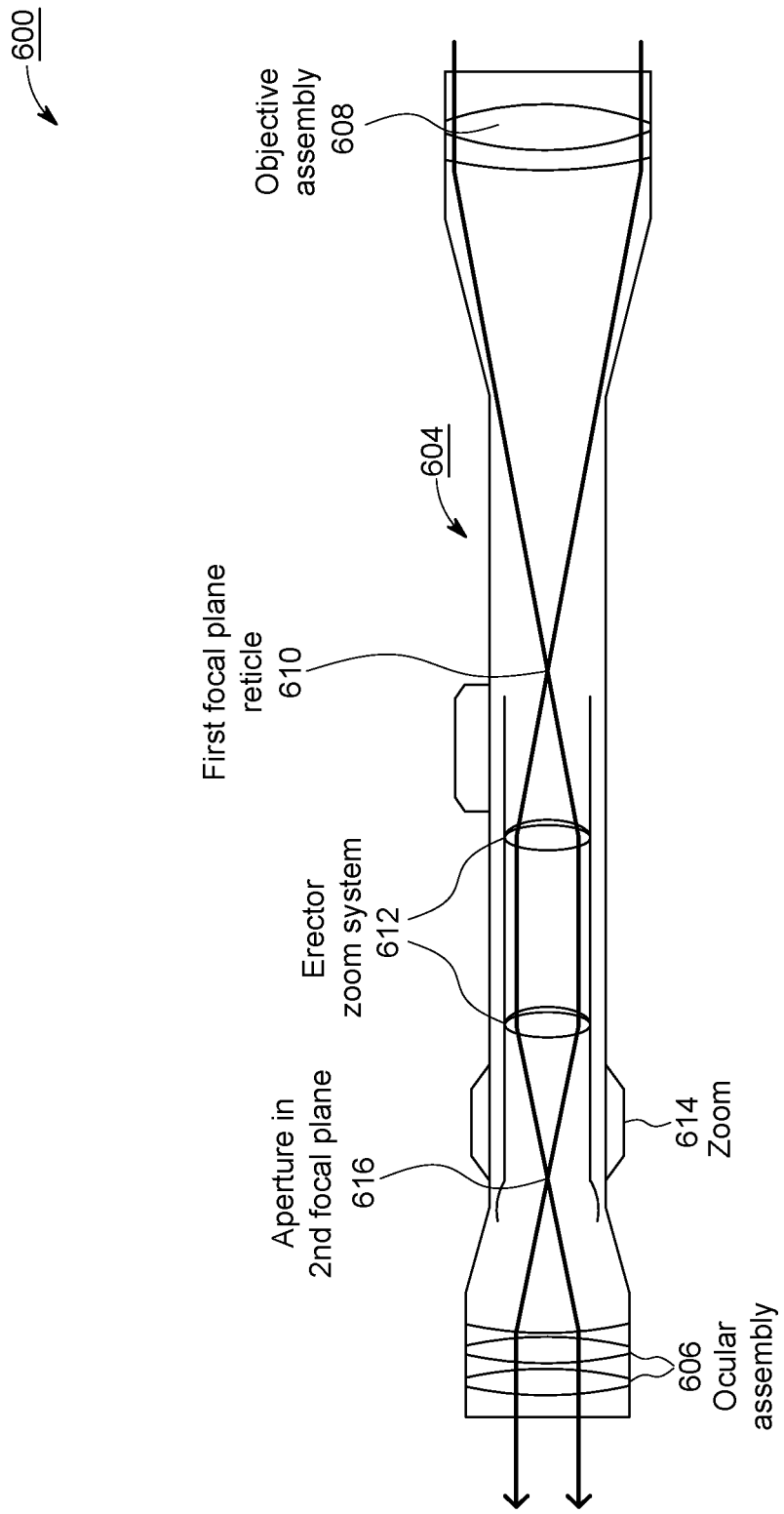
FIG. 6 illustrates an optical device and some components in accordance with embodiments of the present disclosure.

FIG. 6 illustrates an optical device 600 and some components in accordance with embodiments of the present disclosure. An optical device 600 can include a scope, telescope, or other type of scope, but can also include binoculars, thermal imagers, IR imagers, laser rangefinders, etc. The optical device 600 can include a main body assembly 604. The main body assembly 604 can include an objective assembly 608 and a focal assembly with a first focal plane 610, an erector zoom system 612, and an aperture in the second focal plane 616. The optical device 600 includes an ocular assembly 606, which can be removable by a bayonet latch, as described herein The inside of optical device 600 can function much like a telescope. In the front of the optical device is the objective lens assembly 608 where light enters the scope body. In the rear of the tube is an ocular lens assembly 606 that focuses that light to the operator's eye. The objective lens assembly 608 transmits light back to the ocular lens assembly 606. The larger the objective size, the more ambient light will be introduced into the scope and to the eye. The focus lens corrects parallax error by moving the focus lens toward and away from the objective lens.

The ocular lens assembly 606 is positioned at the rear of the optical device 600, closest to the operator's eye. Normally, the ocular lens assembly 606 is smaller in diameter than the objective lens assembly 608. The ocular lens assembly 606 is connected onto the main body with a bayonet latch or bayonet connector.

Embodiments of the present disclosure include an optical device that includes an objective assembly, a focal assembly, and an ocular assembly. The ocular assembly is coupled to the optical device using a bayonet latch. The ocular assembly can be removed. A display device can be coupled to the optical device using a bayonet latch. The display device can display information from the objective lens, sensors, or other information to an operator.

What is claimed is:
1. An optical device comprising:
   an ocular assembly comprising:
      an ocular housing comprising an inner surface and an outer surface, the ocular housing comprising a bayonet latch mating surface extending radially inwards from the inner surface of the ocular housing, wherein the bayonet latch mating surface comprises a first electrode; and a main body assembly comprising:
   a main body housing that houses an objective lens assembly, the main body housing comprising an outer surface comprising a bayonet latch receiving surface, wherein the bayonet latch receiving surface comprises a second electrode that electrically couples with the first electrode, and
   an objective lens assembly secured within the main body housing.

2. The optical device of claim 1, further comprising a focal lens assembly housed in the main body housing.

3. The optical device of claim 1, wherein the ocular assembly comprises a digital view screen.

4. The optical device of claim 1, wherein the ocular assembly comprises an afocal optical adapter.

5. The optical device of claim 1, wherein the ocular assembly comprises an ocular lens assembly.

6. An optical device comprising:
an ocular lens assembly; and
a main body assembly, wherein the main body assembly comprises a first bayonet latch surface, and wherein the first bayonet latch surface comprises a first electrode
the ocular lens assembly is removably coupled to the main body assembly by a bayonet latch connector, wherein the ocular lens assembly comprises a second bayonet latch surface, and wherein the second bayonet latch surface comprises a second electrode that electrically couples with the first electrode when the ocular lens assembly is coupled to the main body assembly.

7. The optical device of claim 6, wherein:
the second bayonet latch surface is a bayonet latch mating protrusion; and
the first bayonet latch surface is a bayonet latch receiver to receive the bayonet latch mating protrusion.

8. The optical device of claim 6, wherein:
the first bayonet latch surface is a bayonet latch mating protrusion; and
the second bayonet latch surface is a bayonet latch receiver to receive the bayonet latch mating protrusion.

9. The optical device of claim 6, further comprising a focal lens assembly housed in the main body assembly.

10. The optical device of claim 6, wherein the ocular lens assembly comprises a digital view screen.

11. The optical device of claim 6, wherein the ocular lens assembly comprises an afocal optical adapter.

12. The optical device of claim 6, wherein the ocular lens assembly comprises an ocular lens assembly.

13. An apparatus comprising:
a housing;
an ocular lens assembly housed within the housing; and
a first bayonet latch connector portion to cooperate with a second bayonet latch connector portion on a main body assembly, wherein the first bayonet latch connector portion comprises a first electrode, and wherein the second bayonet latch connector portion comprises a second electrode that electrically couples with the first electrode when the first bayonet latch connector portion is coupled to the second bayonet latch connector portion.

14. The apparatus of claim 13, wherein the first bayonet latch connector portion comprises a bayonet latch mating protrusion.

15. The apparatus of claim 13, wherein the first bayonet latch connector portion comprises a bayonet latch mating receiver.

16. The apparatus of claim 15, wherein the bayonet latch mating receiver comprises an axially oriented receiver slot and a circumferentially oriented locking slot.

17. The apparatus of claim 13, further comprising a display device.

18. The apparatus of claim 13, further comprising an afocal adapter.

* * * * *